United States Patent [19]

Koontz

[11] Patent Number: 4,665,392

[45] Date of Patent: May 12, 1987

[54] METHOD OF AND APPARATUS FOR DETECTING PRESENCE OF A MARK ON A TRANSPARENT SUBSTRATE

[75] Inventor: Harry S. Koontz, Pittsburgh, Pa.

[73] Assignee: PPG Industries, Inc., Pittsburgh, Pa.

[21] Appl. No.: 670,081

[22] Filed: Nov. 13, 1984

[51] Int. Cl.[4] .............................................. G08B 21/00
[52] U.S. Cl. ........................................ 340/674; 377/8; 250/223 R
[58] Field of Search .................... 340/674, 540; 377/8; 250/223 R, 566; 198/502.1

[56] References Cited

U.S. PATENT DOCUMENTS

| | | | |
|---|---|---|---|
| 2,731,621 | 1/1956 | Sontheimer | 377/8 X |
| 3,478,218 | 11/1969 | Wuellner et al. | 250/223 R |
| 3,513,320 | 5/1970 | Weldon | 250/223 R |
| 3,609,380 | 9/1971 | Shaw, Jr. | 250/572 |
| 3,737,629 | 6/1973 | See | 250/566 |
| 3,906,449 | 9/1975 | Marchak | 340/540 |
| 4,281,243 | 7/1981 | Hudler | 250/223 R |
| 4,513,430 | 4/1985 | Vora et al. | 340/674 X |
| 4,553,846 | 11/1986 | Hilton et al. | 250/223 R X |

FOREIGN PATENT DOCUMENTS 926609 5/1973 Canada ................................ 340/674

Primary Examiner—James L. Rowland
Assistant Examiner—Brian R. Tumm
Attorney, Agent, or Firm—Donald Carl Lepiane; Robert A. Westerlund, Jr.

[57] ABSTRACT

An apparatus for and method of detecting and signifying the presence or absence of a product identity mark or the like on a transparent sheet includes detecting facilities having a first part including light transmitting facilities and a second part including light detecting facilities, the first and the second parts mutually spaced apart from a predetermined portion of the sheet that should have the product identity mark applied thereto. If the mark is present at least a portion of light transmitted by the light transmitting facilities will be interrupted by the mark and prevented from reaching the light detecting facilities. Signalling facilities functionally connected to the light detecting facilities generate a "yes" signal when the light detected by the detecting facilities is above a predetermined level and a "no" signal otherwise.

9 Claims, 5 Drawing Figures

4,665,392

METHOD OF AND APPARATUS FOR DETECTING PRESENCE OF A MARK ON A TRANSPARENT SUBSTRATE

BACKGROUND OF THE INVENTION

I. Field of the Invention

The present invention relates to a method of and apparatus for detecting and signifying the presence or absence of a mark on a transparent substrate or sheet.

II. Technological Environment of the Invention

A presently available method known by the applicant for detecting and signifying the presence or absence of a product identity mark or the like, e.g., a trademark, design mark, symbol, etc., on a sheet, is to view the sheet, with the unaided eye, to determine presence or absence of the mark. This manual visual inspection becomes more difficult and expensive within the context of a production line of a glass manufacturing plant, because of fatigue and human error. It is therefore desirable and advantageous to provide a method and apparatus for automatically detecting the absence or presence of a product identity mark or the like on a transparent sheet, and to automatically signal the absence of the mark.

SUMMARY OF THE INVENTION

The present invention, in one of its aspects, relates to an apparatus for detecting and signifying the presence or absence of a product identity mark or the like on a transparent substrate, e.g. sheet. The apparatus of the present invention preferably encompasses detecting facilities having light transmitting and light detecting facilities disposed in spaced relation to each other and to a sheet support, e.g., a conveyor on which a plurality of sheets to be inspected are moving along a sheet movement path. The light transmitting facility transmits a light beam through the sheet movement path at a predetermined location whereat a portion of a sheet to be inspected which should have the mark applied thereto will pass and thereby intersect the light beam. The light detecting facility is operatively associated with the light transmitting facility to detect interruptions of the light beam as it passes through the sheet.

The detecting facilities of the present invention further preferably encompasses signalling facilities responsive to the level of light interruption detected by the light detecting facilities for producing a signal indicative of the presence or absence of the product identity mark on each sheet being inspected. Yet further, the apparatus of the present invention preferably includes sensor facilities for sensing the presence of the leading edge of each sheet to be inspected and for actuating the detecting means, after the leading edge has been sensed by the sensor facilities, for a time period at least sufficient to allow a sheet to be inspected to pass the predetermined location on the sheet movement path.

The present invention also relates to a method for automatically detecting the presence or absence of a product identity mark or the like on one or more transparent sheets, using the above-described apparatus of the present invention.

DETAILED DESCRIPTION OF THE INVENTION

Figure 1:
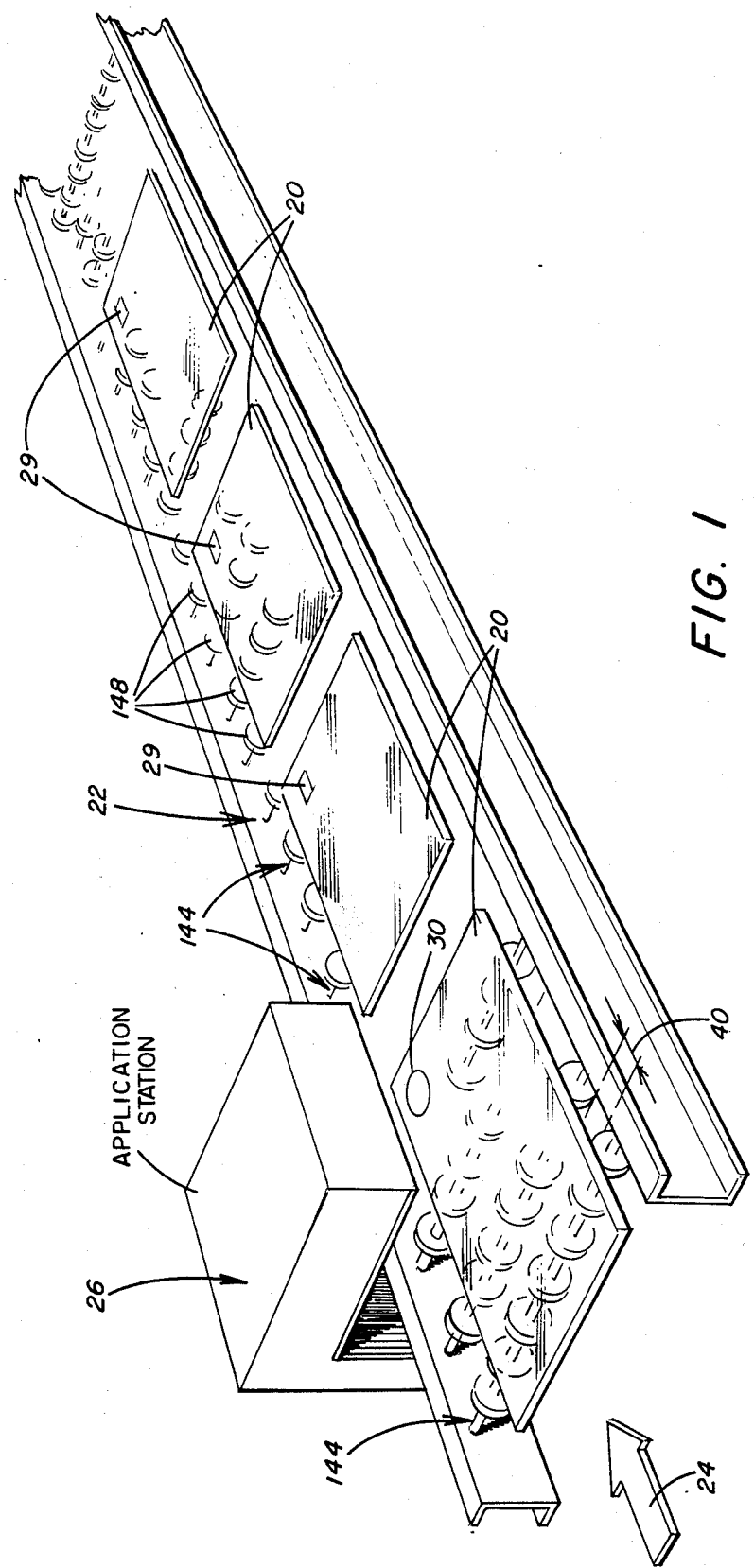
FIG. 1 is a perspective view of a conveyor moving a plurality of sheets having product identity marks affixed thereto, along a sheet movement path, with the mark application station being schematically depicted.
Figure 4:
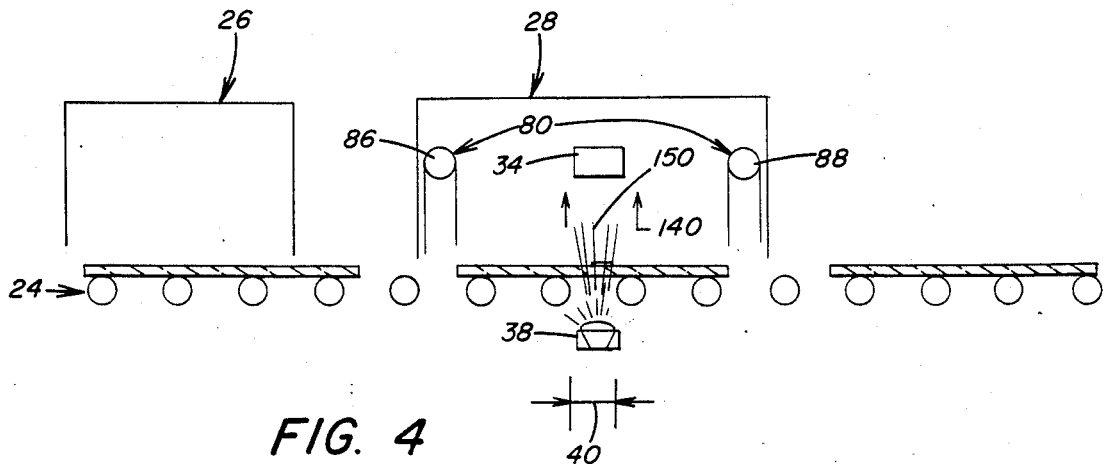
FIG. 4 is a side, elevational, schematic diagram of the apparatus of the present invention.

Referring now to FIG. 1, there can be seen a plurality of discrete, transparent, preferably glass sheets 20 moving on a conveyor 22 along a sheet movement path designated by the arrow 24 from a product identity mark application station 26 toward a product identity mark inspection station 28 (See FIG. 4). The product identity mark application station 26 includes any convenient facilities (not shown) for applying a product identity mark, such as a trademark 29 or the like to a predetermined portion 30 of a major surface of each moving sheet 20, such as an apparatus of the type taught in U.S. Pat. No. 3,488,852, issued to Welker et al., which is herein incorporated by reference or of the type taught in U.S. Pat. No. 3,377,749 issued to L. L. Shumaker, which is also herein incorporated by reference. The term "product identity mark" as used throughout the specification and in the appended claims is defined as any substantially opaque, i.e. substantially light non-transmissive, marking intended to communicate or provide information about the product, e.g., glass sheet, to which it is affixed. By way of example, the product identity mark may consist of an array of alphanumeric code characters which provide information about the product, e.g., date of manufacture, place of manufacture, inspection number, type of product, and/or trademark, or the like, in accordance with a pre-established code. The mark may appear, for example, as follows:

---

PPG INDUSTRIES, INC;
C783 1011 A3AG8
PPG ®

--- wherein, C783 may symbolically represent that the product was manufactured in July, 1983 at Creighton, Pa.; 1011 may be the inspection number; A3AG8 may represent product type, e.g., a 3'×8' architectural glass panel; PPG Industries, Inc. being the name of the manufacturer; and PPG ® being the registered trademark of the above-named manufacturer.

Figure 2:
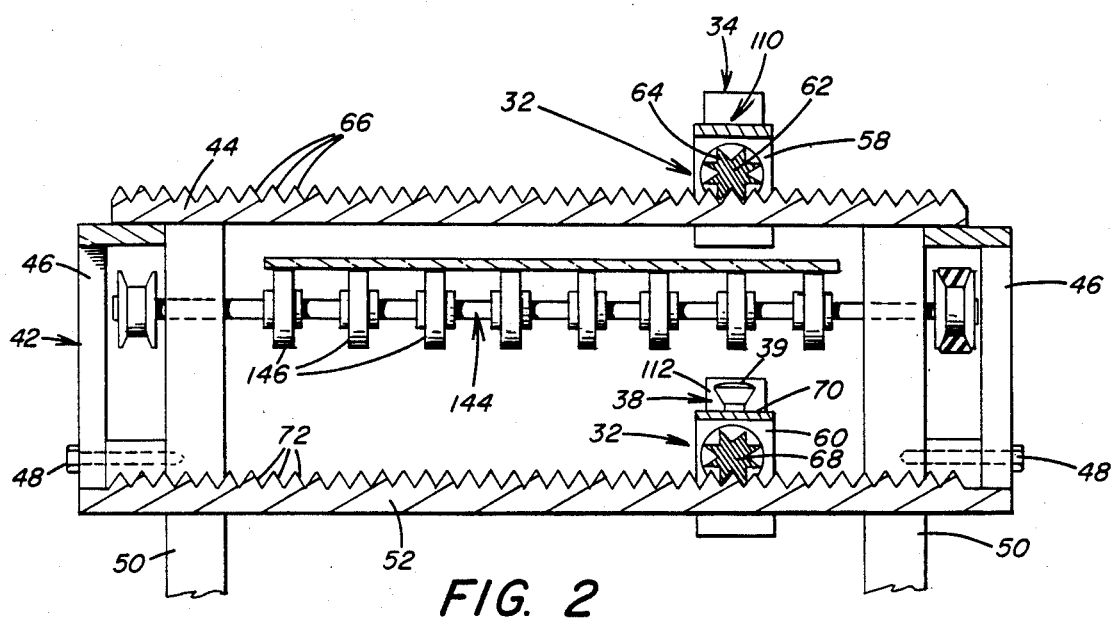
FIG. 2 is a cross-sectional view of the detecting facilities of this invention having portions removed for purposes of clarity.
Figure 3:
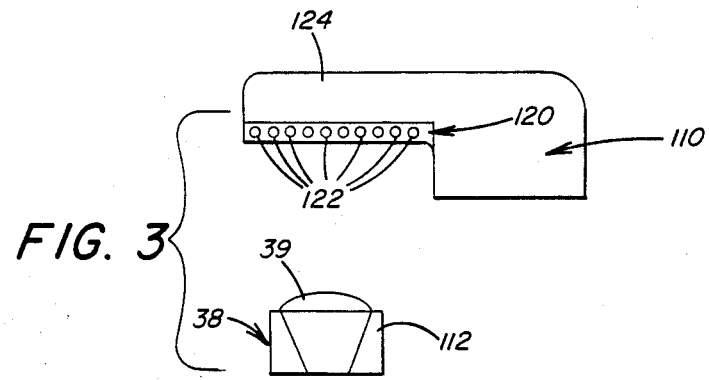
FIG. 3 is a side, elevational view of the detecting facilities of FIG. 2, in two-part isolation.

Referring additionally to FIGS. 2 and 3, the product identity mark inspection station 28 preferably encompasses detecting facilities 32 having a first part 34 disposed above a predetermined location on the sheet movement path 24 whereat the predetermined portion 30 of each moving sheet 20 will pass, and a second part 38 disposed beneath a light transmissive part 40 of the conveyor 22 in opposed, functionally cooperative relation to the first part 34.

The inspection station 28 further preferably encompasses supporting facilities 42 for supporting the first and second parts 34, 38 of the detecting facilities 32 in the above-described relation. The supporting facilities 42 preferably encompass a first elongate bridge member 44 having downwardly extending arms 46 which are attached by any convenient means, such as bolts 48 to support standards 50 of the conveyor superstructure (not shown) and a second elongate bridge member 52 which is attached by any convenient means, such as by welding, to the support standards 50. The first and the second bridge members 44,52 are preferably disposed transversely across the sheet movement path 24 in directly opposed relation to each other, above and below the sheet movement path 24, respectively. The bridge members 44,52 are constructed of steel, or any other convenient strong and durable material, such as steel alloys. The supporting facilities 32 preferably further encompass a first carriage member 58 adapted for reciprocable movement along the first bridge member 44 and a second carriage member 60 adapted for reciprocable movement along the second bridge member 52. More particularly, with specific reference to FIG. 2, the first carriage member 58 has a pinion 62 rotatably mounted thereto, the teeth 64 of the pinion 62 being intermeshedly engagable with equally spaced teeth 66 provided along the length of the first bridge member 44, and the second carriage member 60 has a pinion 68 rotably mounted thereto, the teeth 70 of the pinion 68 being intermeshedly engagable with equally spaced teeth 72 provided along the length of the second bridge member 52. Torquing facilities (not shown) are operatively connected to the pinions 62,68 to impart rotational movement to the pinions 62,68 in forward and reverse directions, successive ones of the teeth 64,70 of the pinions 62,68 intermeshedly engaging/cooperatively intermeshing successive ones of the teeth 66,72 of the bridge members 44,52, respectively, to effectuate reciprocal movement of the first and the second carriage members 58,60 along the first and the second bridge members 44,52, respectively, to any selected position above and below the sheet movement path 24, respectively. The torquing facilities can suitably be any convenient torquing means such as electric motors or hydraulic torquing means, etc.

The supporting facilities 42 further encompass mounting facilities 110,112 for mounting the first and the second parts 34,38 of the detecting facilities 32 to the first and the second carriage members 58,60, respectively, in any convenient manner, for simultaneous reciprocal movement therewith.

Mounting facilities 110 of the supporting facilities 42 preferably encompass a rigid housing 110, made of metal, plastic, or any other convenient environmentally protective strong and durable material, attached to, e.g., bolted or welded to, the first carriage member 58. The housing 110 contains the first part 34 of the detecting facilities 32. The first part 34 preferably encompasses an array or bank 120 of photosensitive elements 122 mounted within a laterally projecting wing 124 of the housing 110, the housing 110 being supported by the first carriage member 58 at a position on the first bridge member 44 such that the bank 120 of photosensitive elements 122 which are preferably photodiodes 122 are disposed in facing relationship to the predetermined location on the sheet movement path 24 whereat the predetermined portion 30 of each moving sheet 20 will successively pass, as can be seen in FIG. 1. The bank 120 of photodiodes 122 are electrically connected to electrical circuitry (shown schematically in FIG. 5) further encompassed by the first part 34 and conveniently mounted within the housing 110. The electrical circuitry is further electrically connected to sensors 86,88 as will be described hereinafter.

A major purpose of this inventive concept is the provision of the product identity mark inspection station 28 to automatically detect the presence or absence of the product identity mark on each of the moving sheets 20 as they individually pass through the inspection station 28 along the sheet movement path 24, and to alert appropriate plant personnel when the mark is absent from any sheet 20, to facilitate timely corrective/remedial action, which may encompass adjustments to the trademark application station 26 and/or appropriately marking the product identity mark-deficient sheets.

It will be appreciated that the particular type and/or construction of the supporting facilities 42 and/or means for moving the first part 34 and the second part 38 of the detecting facilities 32 is not limiting to this invention. The detecting facilities 32 may suitably be stationarily mounted or the first and the second parts 34,38 may be reciprocally movable transverse to the sheet movement path 24 by hydraulic cylinders, linear drive motors, belt or chain-driving means, or any other convenient reciprocating means. The primary reason for having transversely reciprocable detecting facilities 32 is to facilitate easy and quick adjustment of the position of the detecting facilities 32 to accommodate varying placements of the product identity marks on the moving sheets 20, i.e., when the predetermined portion 30 selected for affixation of the mark 29 varies. However, as will be appreciated, the detecting facilities 32 can be stationarily mounted about the sheet movement path 24 at an appropriate identity mark-detecting position.

The following terms which appear herein throughout are defined for clarification and consistency purposes. The term "downstream" refers to the direction the moving glass sheets travel from the product identity mark application station 26 toward the product identity mark inspection station 28, and the term "upstream" refers to the opposite direction. The term "leading edge" refers to the edge of each moving sheet 20 which is furthest downstream, and the term "trailing edge" refers to the opposite edge of each sheet 20.

With reference to FIG. 4, the product identity mark inspection station 28 is shown to further encompass sensing facilities 80 to sense the leading edge and the trailing edge of each sheet 20 at spaced first and second points on the sheet movement path 24, respectively, between which the detecting facilities 32 are situated. The sensing facilities 80 are preferably operatively connected to the first part 34 of the detecting facilities 32. More particularly, the sensing facilities 80 are preferably fiber optic sensors 86,88. The upstream sensor 86 defines the upstream outer limit of the inspection station 28 and the downstream sensor 88 defines the downstream outer limit of the inspection station 28. The sensors 86,88 are conveniently attached, e.g., by bolts (not shown), to the support standards 50 of the conveyor superstructure adjacent to the sheet movement path 24.

Referring again to FIG. 2, the second part 38 of the detecting facilities 32 is shown to be a light source 39, preferably an ultraviolet lamp, secured to the second carriage member 60 by means of mounting facilities 112, which are attached to the second carriage member 60 in any convenient manner, e.g., by nut and bolt assemblies or welding. The ultraviolet lamp 39 is preferably carried by the second carriage member 60 in a Position on the second bridge member 52 such that the lamp 39 is disposed in directly opposed, facing relationship to the bank 120 of photodiodes 122 (see FIG. 3), at all times during an inspection operation. More particularly, the torquing facilities (not shown) are preferably of the synchronous-action type, such as to reciprocate the first and the second carriage members 58,60 along the first and the second bridge members 44,52, respectively, in synchronicity, such that the lamp 39 and the bank 120 of photodiodes 122 are always in directly opposed, facing relationship to each other. The lamp 39 emits or transmits a beam or column of light through a light transmission path 140 defined by the path the column 150 of light travels from the lamp 39 upwardly through a light transmissive part 40 of the conveyor 22, which is defined by the void space between any two adjacent rows 144 of donut rolls 146 of the conveyor 22, the light thenceforth traveling into the bank 120 of photodiodes 122. The column 150 of light preferably has a column length at least as great as the length of the bank 120 and a colum width at least as great as the width of the bank 120.

Figure 5:
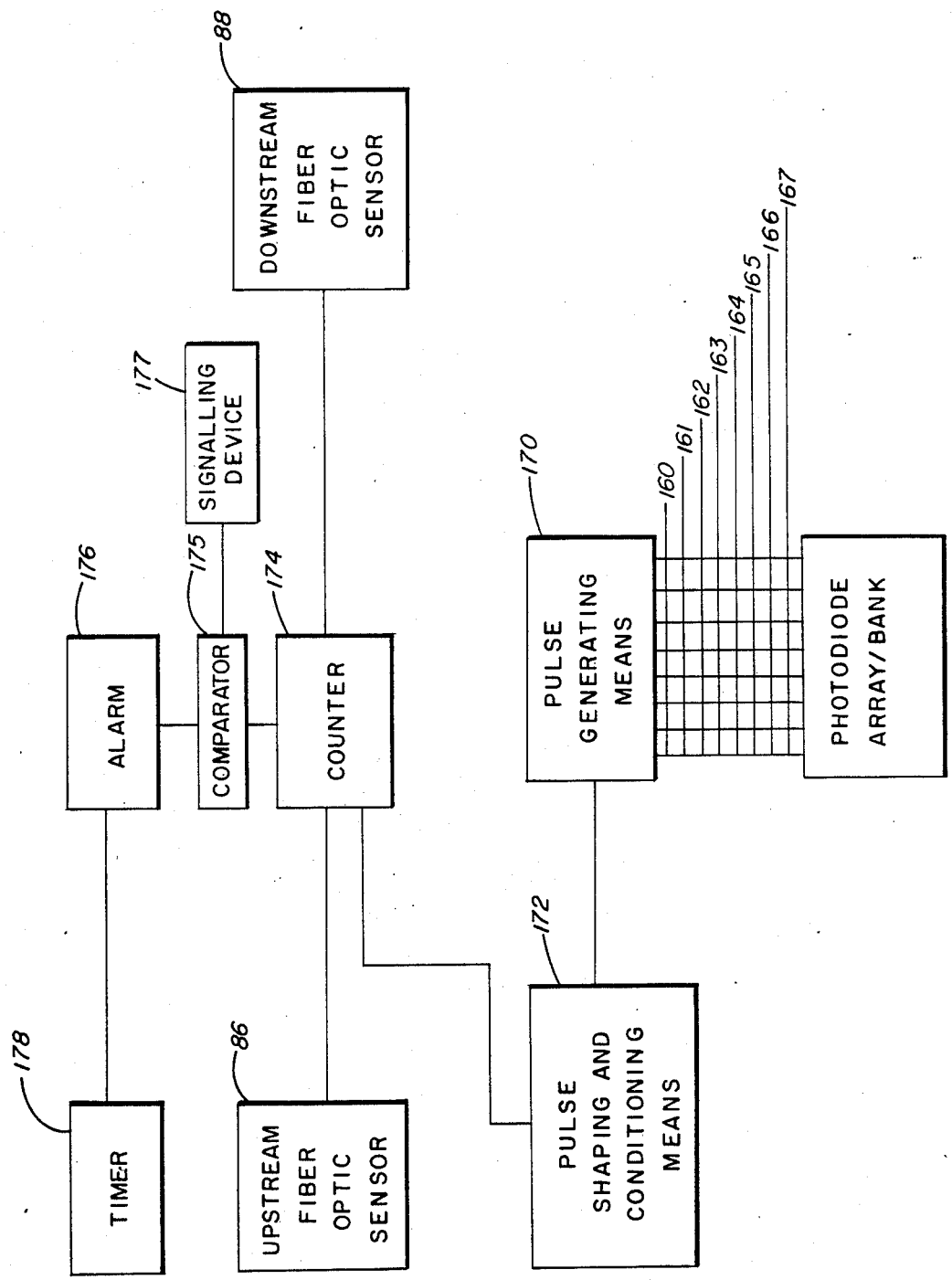
FIG. 5 is a flow chart diagram of the electrical circuitry of the detecting and sensing facilities of this invention.

Referring now to FIG. 5, the electrical circuitry mounted within the housing 110 will be discussed. The circuitry encompasses a plurality of conductive wires or conduits 160–167 electrically connecting the eight (this number is not limiting to the invention) photodiodes 122 to a pulse generating sub-circuit 170, which is in turn electrically connected to a pulse shaping and conditioning sub-circuit 172 which is in turn electrically connected to a counter 174 which is electrically connected to a comparator 175 which is electrically connected to an alarm 176. The alarm 176 is electrically connected to a timer 178, which is electrically connected to the upstream fiber optic sensor 86. The upstream and the downstream fiber optic sensors 86,88 are each electrically connected to the counter 174.

In operation, the invention works in the following preferred manner. A moving transparent sheet 20 enters the upstream end of the product identity mark inspection station 28. The leading edge of the sheet 20 is sensed by the upstream fiber optic sensor 86 which in response thereto sends an electrical signal to the timer 178 to actuate the timer 178. The timer 178 is preset to automatically actuate the alarm 176 after a predetermined time period has elapsed. The time period selected should be at least long enough to allow a glass sheet 20 to pass the detecting facilities 32, yet short enough for the alarm 176 to be actuated before the leading edge of the next sheet 20 arrives at/reaches the inspection station 28, i.e., before the upstream fiber optic sensor 86 senses the leading edge of the next sheet 20. As the sheet 20 passes along the sheet movement path 24 through the inspection station 28, the predetermined portion 30 of the sheet 20 which should have the trademark 29 already applied thereto by the application station 26, will pass over the predetermined location on the sheet movement path 24 (see second paragraph of this description of the invention), between the bank 120 of photodiodes 122 and the ultraviolet lamp 38. If the trademark 29 is present, i.e., has indeed been already applied to the predetermined portion 30 of the sheet 20, the column 150 of light emanating from the lamp 38 will be interrupted due to the opaqueness of the trademark 20 which creates an obstruction in the light transmission path 140. The interruption of the light column 150 by the trademark 29 prevents light from reaching at least one of the eight photodiodes 122 constituting the bank 120. When light does not reach a photodiode 122, an electrical signal is responsively conducted through its correspondent electrical lead (any of 160–167) to the pulse generating sub-circuit 170. The pulse generating sub-circuit 170 then, in response to the electrical signal, sends an electrical pulse to the pulse shaping and conditioning sub-circuit 172, which functions to convert the electrical pulse into a useable pulse of a predetermined shape, size and condition. The pulse shaping and conditioning sub-circuit 172 then transmits the useable pulse to the counter 174. Since the trademark 29 may be comprised of many rows and/or columns of individual characters of any type, e.g., numbers, letters, logos, etc., it can be appreciated that at least a corresponding number of interruptions of the light column 150 projected by the lamp 38 will occur, thus resulting in a corresponding number of useable pulses being transmitted to the counter 174. It should be noted that a single character may prevent the light from reaching more than a single photodiode 122, thereby ultimately causing the generation and transmission of more than a single useable pulse to the counter 174 in response to the detection of that particular character of the trademark 29.

The counter 174 is automatically initialized, or reset to a zero or base operating condition, by an electrical signal sent to the counter 174 by the upstream fiber optic sensor 86 in response to its sensing the leading edge of the sheet 20, and simultaneously actuated to thus begin counting, from 0, the number of useable pulses it receives. However, to minimize the risk of counting errant or stray pulses caused by inadvertent or incidental marks or spots, the counter is initialized or reset by the upstream fiber optic sensor 86 and then actuated, to begin counting, by an electrical signal transmitted by the downstream fiber optic sensor 88 in response to the downstream sensor 88 sensing the leading edge of the sheet 20. Within this latter configuration, it is necessary that the predetermined portion 30 of the sheet 20 be upstream of the detecting facilities 32 when the leading edge is sensed by the downstream fiber optic sensor 88, or else the trademark 29 will pass the detecting facilities 32 before the counter 174 is actuated, thus causing the trademark 29 to pass by undetected.

Next, when the trailing edge of the sheet 20 is sensed by the downstream fiber optic sensor 88, the sensor 88 responsively conveys an electrical signal to the counter 174 to disactuate it and to further cause the counter 174 to send an electrical signal representative of the number of useable pulses it has counted to the comparator 175. The comparator 175 then compares the value of the signal it receives from the counter 174 with a predetermined value representative of the minimum number of pulses (e.g., 12) which should have been registered by the counter 174 if the trademark 29 is present on the sheet 20. If the value of the counter 174 signal is greater than the predetermined value stored into the comparator 175, then the comparator 175 responsively conveys an electrical signal to the alarm 176 to override the signal which will be sent by the timer 178 to the alarm 176, to prevent actuation of the alarm 176 by the timer 178 signal.

In order to discriminate between an actual trademark 29 and an incidental or inadvertent opaque or dark spot or mark on the glass sheet 20, the predetermined number of pulses selected to trigger the comparater 175 to convey the alarm 175 override signal should be greater than the number of pulses which would be engendered by these incidental marks. In the actual practice of this invention, the minimum number of pulses was selected to be twelve, whereas the maxiaum number of pulses generally attributable to stray marks is about three to five. A typical product identity mark affixed to glass sheets actually inspected by the apparatus of this invention appears as follows:

| SAFETY | | FLO-LITE |
|---|---|---|
| AS-2 | PPG | 28-1 |
| | SOLID TEMPERED | |
| | HEATED | |
| | DOT 018M36.5 | |

The apparatus of this invention has been found to be 99%+ accurate with the minimum number of pulses selected to engender the alarm 176 override signal selected to be twelve, in conjunction with product identity marks generally of the above-described nature, which have been found to generate about 60 pulses. Additionally, the comparator 175 signal can be employed to actuate any signalling device 177 which in response to the comparator 175 signal would produce a "yes" signal representative of the presence of the trademark 29 on the sheet 20, e.g., a green light emitting diode (LED), lamp, or any other convenient signalling device could be thusly employed.

However, if the value of the counter 174 signal is less than the predetermined value stored into the comparator 175, then the comparator 175 responds by not doing anything at all, and the alarm 176 is therefore permitted to be actuated by the timer 178 after the predetermined time period has lapsed. The alarm 176 can be any convenient type of sound alarm suited for alerting appropriate plant personnel to the absence of the trademark 29 from the sheet 20, so that appropriate corrective and/or other action may be taken. Further, a visual indicator device such as a red LED lamp, or any other convenient signalling device, could be actuated by the timer 178 signal to provide a no signal indicative of the absence of the trademark 29 from the sheet 20. Further, it is desirable and preferred to locate the product identity mark inspection station 28 as near as possible to the product identity mark application station 26, within the constraints of the glass production line configuration, in order to minimize the response time necessary to rectify any problems associated with the application station 26. Yet further, the timer 178 may activate the alarm 176 which may be any convenient marking means for marking a trademark deficient sheet in any appropriate manner to distinguish/characterize the sheet as such, e.g., an electrically actuated, solenoid operated crayon marker mechanism, e.g., of the type taught in U.S. Pat. No. 3,793,983, which teachings are herein incorporated by reference.

The entire operating cycle hereinabove described is then repeated for each moving sheet 20, without interruption of the sheet 20 flow along the sheet movement path 24.

It will become apparent to those skilled in the art, that various modifications and/or alternative embodiments of this invention are possible without departing from the spirit and scope of the basic inventive concept herein taught.

The present invention should be interpreted solely on the basis of the following claims.

What is claimed is:

1. An apparatus for inspecting a transparent sheet to determine the presence or absence of a product identity mark, comprising:

an inspection station;

means for moving the sheet to be inspected along a sheet movement path through said inspection station;

means for transmitting light beams mounted on one side of the sheet movement path to transmit light beams through the sheet as it moves along the sheet movement path;

a plurality of photosensitive elements mounted on other side of the sheet movement path to intercept the light beams passing through the sheet to be inspected, said elements generating signals in response to a substantially opaque mark on a major surface portion of the sheet interrupting the flow of light beams transmitted through the sheet movement path and incident on said elements;

means acting on the signal from said elements for shaping and conditioning the signal into pulses of a predetermined shape, size and condition, the number of pulses being a function of the light beams passing through the product identity mark incident on said elements;

means for counting the pulses;

means responsive to said counter means for generating one type of signal when the number of pulses is above a predetermined level to indicate the presence of an identity mark and a different type of signal when the number of pulses is below a predetermined level to indicate the absence of an identity mark;

upstream means for sensing leading edge of the sheet as it moves downstream along the sheet movement toward the light beams;

downstream means for sensing leading and trailing edges of the sheet as it moves along the sheet movement path away from the light beams:

means responsive to said upstream and downstream sensing means for generating a first and second signal when the upstream sensing means senses the leading edge of the sheet, a third signal when the downstream sensing means senses the leading edge of the sheet and a fourth signal when the downstream sensing means senses the trailing edge of the sheet and for forwarding the third signal to said counter means for actuating said counter means to start counting the number of pulses received from said pulse shaping and conditioning means and for forwarding said fourth signal to said generating means to transmit the one type of signal and suppress/override said second electrical signal if the number of said pulses counted by said counter means exceeds said predetermined number;

means responsive to said first signal and acting on said counter means for resetting said counter means to base/initial operating condition;

a timer means responsive to said second signal and acting on said generating means to actuate said generating means, after a predetermined time, to transmit the different type of signal; and wherein the predetermined time associated with said timer means elapses after said fourth signal is relayed to said generating means and before said upstream sensing means senses the leading edge of the next sheet moving along said sheet movement path.

2. The apparatus as set forth in claim 1, wherein said resetting means functions to both reset and to actuate said counter means when said first signal is received by said resetting means and eliminating said relaying means.

3. The apparatus as set forth in claim 2, further including a means responsive to the absence of said product identity mark for marking said sheet with an appropriate, predetermined mark to indicate the absence of the product identity mark.

4. The apparatus as set forth in claim 2, wherein said generating means includes an alarm which is actuatable to generate one type of sound when the number of said useable pulses counted by said counter means is below or equal to said predetermined number, or a different type of sound when the number of useable pulses is above the predetermined number.

5. The apparatus as set forth in claim 2, wherein said generating means includes a lamp means which emits light of one color when the number of said useable pulses counted by said counter means is below or equal to said predetermined number and a light of a different color when said useable pulses counted by said counter means is above said predetermined number.

6. An apparatus for inspecting a transparent sheet to determine the presence or absence of a product identity mark on the sheet, comprising:
an inspection station;
means for moving the sheet to be inspected along a sheet movement path through said inspection station;
means mounted on one side of the sheet movement path to transmit light beams through the sheet movement path;
a plurality of photosensitive elements, said elements generating signals in response to a substantially opaque mark on a major surface portion of the sheet interrupting the flow of light beams transmitted through the sheet and incident on said elements;
a housing means for mounting said plurality of photosensitive elements on the other side of said path in light-receiving relationship to said light transmitting means, wherein a light transmission path is defined by the path travelled by the light transmitted by said light transmitting means from said light transmitting means, through the sheet, and into said photosensitive elements;
means for synchronously moving said means to transmit light beams and said elements transversely across the sheet movement path to position said photosensitive elements in spaced relation to varying predetermined locations on the sheet movement path to determine if an identity mark is affixed to the sheet and to maintain said elements in light-receiving relationship to said light transmitting means;
means acting on the signals from said elements for shaping and conditioning the signal into pulses of a predetermined shape, size and condition, the number of pulses being a function of the light beams passing through a substantially opaque mark on the glass sheet and thereafter incident on said elements; and
means acting on the pulses from said shaping and conditioning means for counting the pulses and for generating one type of signal when the number of pulses is above a predetermined level to indicate the presence of the product identity mark and another type of signal when the number of pulses is below a predetermined level to indicate the absence of the product identity mark.

7. The apparatus as set forth in claim 6, wherein it further comprises facilities for sensing the presence of each sheet moving along the sheet movement path relative to a reference point, wherein said sensing facilities, in response to sensing the presence of one of the moving sheets, resets and actuates said means for counting and generating to count the number of said pulses attributable to said one of the moving sheets moving past said inspection station.

8. An apparatus for inspecting a transparent sheet to determine the presence or absence of a product mark, comprising:
an inspection station;
means for moving the sheet to be inspected along a sheet movement path through said inspection station;
means for transmitting light beams mounted on one side of the sheet movement path to transmit light beams through the sheet as it moves along the sheet movement path;
a plurality of photosensitive elements mounted on other side of the sheet movement path to intercept the light beams passing through the sheet to be inspected, said elements generating signals in response to a substantially opaque mark on a major surface portion of the sheet interrupting the flow of light beams transmitted through the sheet movement path incident on said elements;
means acting on the signals from said elements for shaping and conditioning the signals into pulses of a predetermined shape, size and condition, the number of pulses being a function of the light beam passing throughout the product identity mark incident on said elements;
means for counting the pulses and for generating one type of signal when the number of pulses is above a predetermined level to indicate the presence of an identity mark and a different type of signal when the number of pulses is below a predetermined level to indicate the absence of an identity mark;
bridging means having a first bridge member disposed in spaced relation to and transversely across said sheet movement path and a second bridge member disposed in spaced relation to said first bridge member and transversely across said sheet movement path;
a first carriage member mounting said light transmitting means;
a second carriage member mounting said plurality of elements;
means for mounting said first carriage member to said first bridge member and said second carriage member to said second bridge member; and
means for synchronously moving said first and said second carriage members to any selected position on said first and said second bridge members, respectively, in such a manner as to continuously maintain said plurality of photosensitive elements in light-receiving relationship to said light transmitting means.

9. The apparatus as set forth in claim 8 wherein said transparent sheet is a glass sheet and said product identity is a trademark.

* * * * *

UNITED STATES PATENT AND TRADEMARK OFFICE
CERTIFICATE OF CORRECTION

PATENT NO.   :   4,665,392

DATED        :   May 12, 1987

INVENTOR(S)  :   Harry S. Koontz

It is certified that error appears in the above-identified patent and that said Letters Patent is hereby corrected as shown below:

In line 6 of the Abstract, insert "being" after "second parts".

Signed and Sealed this

Tenth Day of May, 1988

*Attest:*

DONALD J. QUIGG

*Attesting Officer*   *Commissioner of Patents and Trademarks*